United States Patent [19]
Woolley

[11] Patent Number: 5,991,351
[45] Date of Patent: Nov. 23, 1999

[54] METHOD AND SYSTEM TO DIRECTLY PRODUCE ELECTRICAL POWER WITHIN THE LITHIUM BLANKET REGION OF A MAGNETICALLY CONFINED, DEUTERIUM-TRITIUM (DT) FUELED, THERMONUCLEAR FUSION REACTOR

[75] Inventor: Robert D. Woolley, Belle Mead, N.J.

[73] Assignee: U.S. Department of Energy, Washington, D.C.

[21] Appl. No.: 09/158,006

[22] Filed: Sep. 22, 1998

[51] Int. Cl.$^6$ .............................. G21B 1/00; H02K 44/08
[52] U.S. Cl. ................................. 376/147; 310/11
[58] Field of Search ..................... 376/147, 320, 376/321; 310/11

[56] References Cited

U.S. PATENT DOCUMENTS 3,345,524  10/1967  Kidwell ................................. 376/147
4,746,484  5/1988  Jassby ................................... 376/147

*Primary Examiner*—Daniel D. Wasil
*Attorney, Agent, or Firm*—Bradley W. Smith; Mark P. Dvorscak; William R. Moser

[57] ABSTRACT

A method for integrating liquid metal magnetohydrodynamic power generation with fusion blanket technology to produce electrical power from a thermonuclear fusion reactor located within a confining magnetic field and within a toroidal structure. A hot liquid metal flows from a liquid metal blanket region into a pump duct of an electromagnetic pump which moves the liquid metal to a mixer where a gas of predetermined pressure is mixed with the pressurized liquid metal to form a Froth mixture. Electrical power is generated by flowing the Froth mixture between electrodes in a generator duct. When the Froth mixture exits the generator the gas is separated from the liquid metal and both are recycled.

17 Claims, 2 Drawing Sheets

METHOD AND SYSTEM TO DIRECTLY PRODUCE ELECTRICAL POWER WITHIN THE LITHIUM BLANKET REGION OF A MAGNETICALLY CONFINED, DEUTERIUM-TRITIUM (DT) FUELED, THERMONUCLEAR FUSION REACTOR

CONTRACTUAL ORIGIN OF THE INVENTION

The United States Government has rights in this invention pursuant to Contract No. DE-AC02-76CH03073 between the U.S. Department of Energy and Princeton University.

BACKGROUND OF THE INVENTION

This invention relates to thermonuclear fusion electrical power generation and specifically, to a method and system for producing electrical current directly from the lithium blanket region of a magnetically confined, deuterium-tritium (DT) fueled, thermonuclear fusion reactor.

At the present time magnetically confined thermonuclear fusion reactors have not yet been fully developed for practical application in energy production. Although experimental magnetically confined thermonuclear fusion reactors have been constructed and fusion energy released, no reactor has achieved the necessary goal of self-sustained thermonuclear ignition and burn of a plasma, nor reached the easier and more preliminary "break-even" experimental milestone in which the released fusion energy equals the necessary investment of energy in plasma heating and confinement. Nevertheless, these goals are being pursued by ongoing experimental research and have been approached when using geometric arrangements for magnetic confinement of the plasma producing a set of toroid shaped, closed "magnetic surfaces" nested inside each other and filling the plasma volume. There are several slightly different competing versions of these toroidal magnetic geometry arrangements, e.g., the tokamak, the symmetrical torus (ST), the reversed-field pinch (RFP), the stellarator, and the torsatron, among others. At the present time, significant fusion energy release has only been achieved in the tokamak magnetic geometry using a plasma consisting of a mixture of deuterium and tritium (DT) fuels.

FIG. 1 illustrates the general three dimensional geometric arrangement of magnet components typically used in such toroidal magnetic confinement thermonuclear fusion reactors, emphasizing the approximate rotational symmetry of the arrangement. It shows the outer toroidal "magnetic surface" of the confined plasma, which in the tokamak version is nearly axisymmetric about a geometric center line A—A. It also shows a set of toroidal field (TF) electromagnet coils which link the plasma, and various axisymmetric poloidal field (PF) electromagnet coils which do not link the plasma. In a tokamak, multiple identical TF electromagnet coils are used and distributed uniformly in a rotationally symmetrical manner about the center line A—A, thus forming a quasiaxisymmetric set. An external electrical power control system causes electrical current to flow in each of these TF electromagnet coils. The total overall spatial distribution of electrical currents in the TF electromagnetic coils, and the plasma, naturally produces the confining magnetic field in the plasma's toroidal region, according to the fundamental physical laws of electromagnetism.

Many variations of the device geometry shown in FIG. 1 are possible, including the mechanical construction of the TF electromagnets as shown but consisting of demountable subassemblies; simple noncircular deformations of the electromagnet coil shapes; and even complicated nonplanar helical hybrid combinations of the PF and TF electromagnets.

Components not shown in FIG. 1 include a (nonmagnetic) vacuum vessel which is needed to keep air away from the plasma. The vacuum vessel typically has a toroidal shape in order to enclose the plasma, and is located between the plasma and the TF electromagnet coils.

Additionally, the fusion blanket or alternatively the liquid metal blanket, which is believed to be necessary for practical energy production from fusion, is not depicted. At the present time, fusion blankets have been proposed, but no fusion blanket has yet been successfully tested for an experimental, operational thermonuclear fusion reactor. Because most of the released thermonuclear fusion energy will exit the plasma in various forms of radiation, e.g., neutrons, x-rays, gamma rays, etc., the fusion blanket must consist of a material of suitable type and thickness to completely absorb such radiation, thus converting the radiation directly to heat in the blanket material or liquid metal. Since the radiation will exit the plasma in all directions, this fusion blanket must completely enclose the toroidal plasma. To avoid losing radiation energy in useless and counterproductive heating of the electromagnets and vacuum vessel, the fusion blanket must necessarily be located adjacent to the plasma, i.e., inside the TF electromagnet coils and vacuum vessel and be capable of absorbing the radiation.

For a self-sufficient DT reactor, the fusion blanket must also produce the tritium component of the plasma fuel, and the reactor system must breed at least as much tritium as it consumes. This requirement, in turn, dictates that any DT fusion blanket must be largely or completely composed of lithium, the only element which can efficiently produce tritium when it absorbs the neutron radiation resulting from DT fusion in the plasma.

Technical provisions are necessary to continuously transfer and harvest heat from the fusion blanket for electrical power production. Perhaps the simplest imaginable method becomes possible if the blanket material is mostly composed of liquid lithium itself or alternatively some lithium-bearing liquid. Then the liquid blanket material can be pumped around a loop, cycling between the blanket region where it is automatically heated by radiation from the plasma, and a different (and possibly remote) region where the heat is extracted from the liquid and electrical power is produced.

Conventional methods for producing electric power from a heat source employ "balance-of-plant" equipment consisting of a rotating electrical generator mechanically driven by an engine, such as a turbine or a reciprocating piston system, in turn mechanically driven by a thermodynamic working fluid such as steam. For many conventional methods, including methods used with nuclear fission heat sources, heat exchange components provide thermal coupling between the heat source and the working fluid, and additional heat exchangers reject waste heat from the working fluid to the external environment.

Liquid metal magnetohydrodynamic (LMMHD) electrical power generation from an unspecified generic heat source has previously been proposed as a simple and robust method for efficiently producing electrical power. Such proposals have examined various possible 2-phase LMMHD working fluids, including the combined 2-phase lithium/helium working fluid of the present invention. While coupling LMMHD power generation to a thermonuclear fusion reactor heat source has likewise been proposed, the hybrid features of the present method, which are peculiar to a magnetically confined deuterium-tritium (DT) fueled thermonuclear fusion reactor, have not been previously published or claimed.

Accordingly, a first object of the present invention is to provide an improved method and system for producing electric power from a thermonuclear fusion reactor that is not as complex as prior art systems.

Another object is to provide an improved method and system for producing electric power from a thermonuclear fusion reactor that is both safer and more reliable when compared to prior art systems.

Other objects and advantages of the invention will become apparent from the following description and accompanying drawing.

SUMMARY OF THE INVENTION

An important feature of the present invention is the direct DT neutron heating of the energy conversion fluid. This eliminates the dedicated heat exchanger used to transfer fusion energy to the energy conversion fluid of conventional, prior art LMMHD designs.

Yet another feature of the subject invention is the use of a confining toroidal magnetic field replacing the dedicated magnets of the prior art LMMHD designs. The subject invention features an ambient toroidal magnetic field which is utilized for magnetic plasma confinement reasons and which extends into the fusion blanket region. The subject invention uses this existing toroidal magnetic field to generate electrical power, instead of using specialized LMMHD electromagnets.

Additionally, the fusion blanket tritium breeding material, preferably liquid lithium or other lithium bearing liquid, is the same material which is used for the thermodynamic energy conversion working fluid. The gas, preferably helium, of the energy conversion fluid matches the gas naturally produced in the liquid metal as a byproduct of tritium breeding. In addition, the intrinsic gas insertion and extraction features of the LMMHD scheme continuously "sparge" the liquid metal, thus aiding in the continuous removal of bred tritium from the blanket region.

More specifically, the present system produces electrical power from a thermonuclear fusion reactor internal to an extended region of a magnetic confinement field that includes a fusion blanket region, preferably a liquid metal blanket region from which a liquid metal, preferably lithium or other lithium-bearing liquid, flows directly into a closed MHD pump duct having a quasiaxisymmetric shape, where the closed MHD pump duct is located adjacent and in spaced relationship to the liquid metal blanket region, but inside the toroidal envelope enclosed by the thermonuclear reactor's set of TF electromagnet coils. A power source drives an electrical current through the liquid metal between quasiaxisymmetric electrodes located on the MHD pump duct's opposing walls, in a direction perpendicular to the toroidal magnetic field. The resulting J×B body force in the liquid metal is aligned in the direction of fluid flow, forming an electromagnetic pump. Neglecting losses, the pumping ducts electrical power density is J.E which equals J.v×B, and its mechanical pumping power density is $-v.\nabla p$ which equals $-v.J\times B$ where E is the electric field vector, $\nabla p$ is the pressure gradient, v is the fluid velocity, J is the current density, and B is the magnetic field. The MHD pump duct is further in fluid communication with a mixer. The liquid metal is mixed in the mixer with a high pressured gas, preferably helium, forming a two-phase Froth mixture.

The Froth mixture flows into an MHD generator duct, which is another quasiaxisymmetric duct in fluid communication with the mixer and located inside the toroidal envelope enclosed by the thermonuclear reactor's set of TF electromagnet coils. Electrical current flows between quasiaxisymmetric electrodes (similar to the electrodes in the MHD pump duct) located on the MHD generator duct's opposing walls, again in a direction perpendicular to the toroidal magnetic field but in a manner such that the J×B body force in the liquid metal is aligned opposite to the direction of fluid flow, i.e., perpendicular to the flow of the liquid metal and non-collinear to toroidal magnetic field.

By restraining fluid motion, the body force in the MHD generator duct reduces fluid pressure along the flow path, causing the gas bubbles in the Froth Mixture to expand, which in turn tends to accelerate the Froth mixture along the duct. An electrical field is induced perpendicular to the toroidal field by the fluid flow of the Froth mixture through the MHD generator duct, thus generating an electrical voltage between the MHD generator duct's electrodes. Deliberate tapering of the MHD generator duct width is an optional feature of the present system which may be employed to reduce variations of the generated voltage between different electrode locations along the liquid metal flow path through the MHD generator duct.

After the Froth mixture exits the MHD generator duct, a separator separates the liquid metal from the gas, effectively recycling these elements for further use by the system. Optionally, this present system may employ multiple successive LMMHD electrical power production stages, each patterned after the above description, if the resultant increase in system efficiency warrants their inclusion.

The MHD generator duct's simultaneous current flow and generated voltage provide its electrical output power. Part of this generated electrical power is circulated to the power source to operate the MHD pump duct, part of it is circulated to operate other equipment, while the rest of the power is directly available as electrical power output. Alternatively, the two MHD ducts may be designed to operate with identically the same electrical current magnitudes, in which case the two ducts can optionally be electrically interconnected in a series opposition circuit, thus automatically circulating power to operate the MHD pump duct and operating the LMMHD power system in a "self-excited" manner. The use of quasiaxisymmetric geometric shapes for the two MHD ducts and for their "series" electrical circuit is unique to the present system, and guarantees the absence of any undesirable LMMHD magnetic perturbations in the plasma which otherwise might result from producing LMMHD electrical power at a location in close physical proximity to the toroidal plasma. It should be noted, as referenced above, that the components of the power generation system are located so as to employ the confining magnetic field generated by the field electromagnets in the operation of the system.

In another embodiment for which the plasma's confining magnetic field is not necessarily quasiaxisymmetric, the method for producing electrical power from a thermonuclear fusion reactor internal to a plasma magnetic confinement field includes directly flowing the heated liquid metal, preferably lithium or other lithium-bearing liquid, as it exits the fusion blanket region, into a closed MHD pump duct region in the thermonuclear reactor and driving an electrical current therethrough, thus forming an electromagnetic pump by the electrical current's interaction with the plasma magnetic confinement field. After exiting the MHD pump duct region, the liquid metal is then mixed with a high pressure gas, preferably helium, forming a Froth mixture, which flows into and expands inside an MHD generator duct region, also located inside the plasma magnetic confinement field, to generate electrical power. The Froth mixture is recycled so that the liquid metal and gas are again available for power generation. Optionally, this present method may employ multiple successive LMMHD electrical power production stages, each designed in accordance with the above method, if the resultant increase in system efficiency warrants their inclusion.

DETAILED DESCRIPTION OF THE INVENTION

Figure 1:
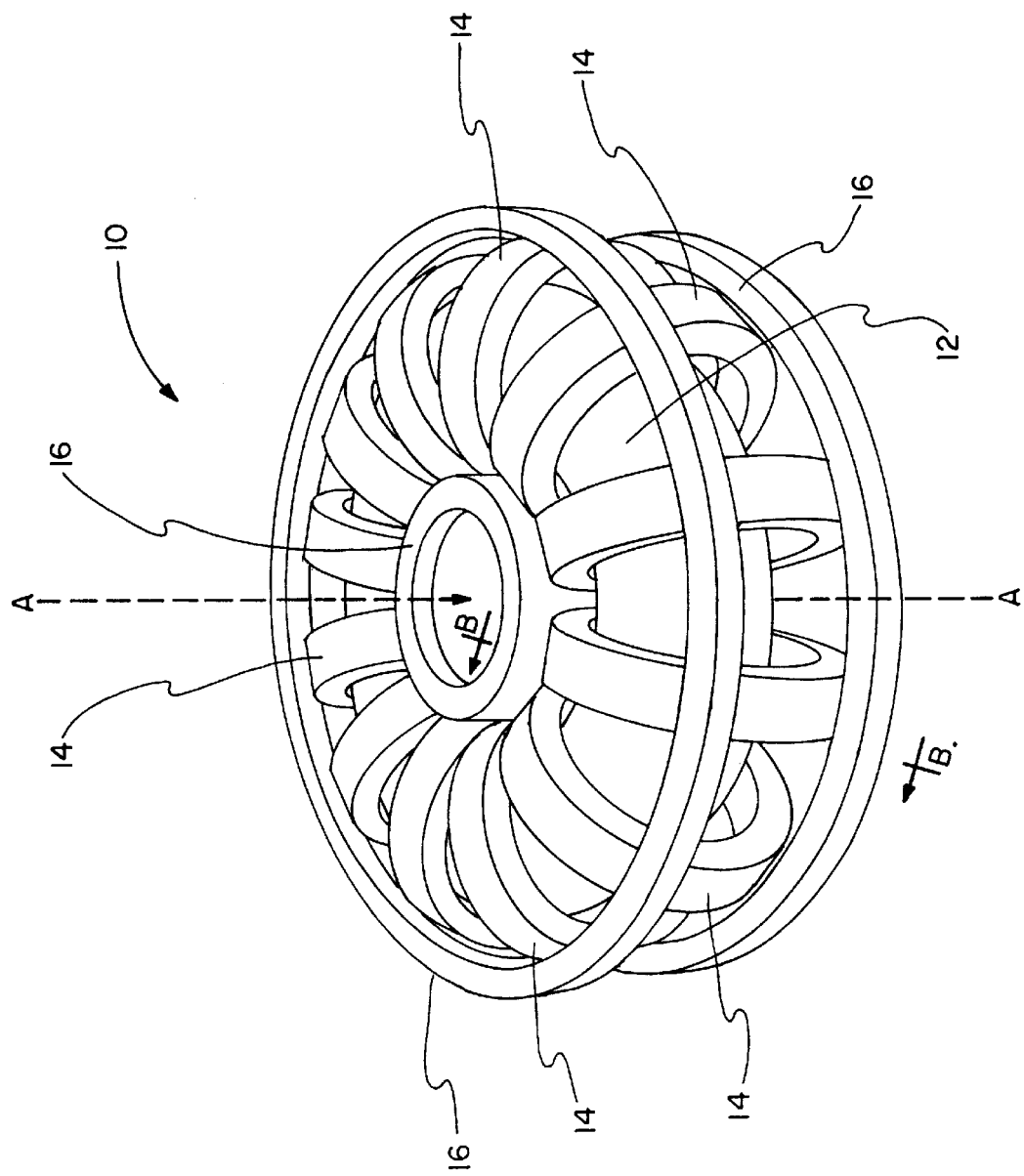
FIG. 1 is a perspective view of the toroidal magnetic confined thermonuclear reactor of the present invention.

Referring now to FIG. 1, the three dimensional geometric arrangement of the magnet components of a DT fueled thermonuclear reactor 10 for a typical toroidal magnetic confinement thermonuclear fusion reactor having rotational symmetry is depicted. FIG. 1 shows an outer toroidal magnetic surface 12 of the confined plasma (not shown), which in the tokamak version is nearly axisymmetric about the geometric center line A—A. It also shows a plurality of toroidal field (TF) electromagnet coils 14 which confine the plasma, and a plurality of axisymmetric poloidal field (PF) electromagnet coils 16. In a tokamak, multiple TF electromagnet coils 14 are used, and are distributed uniformly in a rotationally symmetric manner about the center line A—A, thus forming a quasiaxisymmetric set. External electrical power control systems power each of these TF electromagnet coils 14. The distribution of electrical currents in the TF electromagnetic coils 14 produce the confining magnetic field in the plasma's toroidal region.

Many variations are possible from the embodiment shown in FIG. 1. These variations include the mechanical construction of the TF electromagnet coils 14 as shown but consisting of demountable subassemblies, including simple noncircular deformations of the electromagnet coil shapes, and even including complicated nonplanar helical hybrid combinations of the TF and PF electromagnet coils 14 and 16 respectively.

A component not shown in FIG. 1 is a (nonmagnetic) vacuum vessel which is needed to keep air away from the plasma. This vacuum vessel typically has a toroidal shape in order to enclose the plasma, and separates the plasma from the TF electromagnet coils 14.

Also not shown in FIG. 1 is the fusion blanket, or preferably a liquid metal blanket region, which is necessary for practical energy production from fusion. Because most of the released thermonuclear fusion energy will exit the plasma in various forms of radiation, e.g., neutrons, x-rays, gamma rays, etc., the fusion blanket must consist of material of suitable type and thickness to completely absorb this radiation, thus converting the radiation directly to heat in the blanket material. Since the radiation will exit the plasma in all directions, this fusion blanket must completely enclose the toroidal plasma. To avoid losing radiation energy to useless and counterproductive heating of the TF electromagnet coils 14 and the vacuum vessel, the fusion blanket is located adjacent to the plasma and interior to the TF electromagnet coils 14 and the vacuum vessel.

For a self-sufficient DT reactor, the fusion blanket must also produce the tritium component of the plasma fuel, and the reactor system must achieve a unity tritium breeding ratio. This requirement, in turn, dictates that any DT fusion blanket must be largely or completely composed of lithium, the only element which can efficiently produce tritium when it absorbs the neutron radiation resulting from DT fusion in the plasma.

Figure 2:
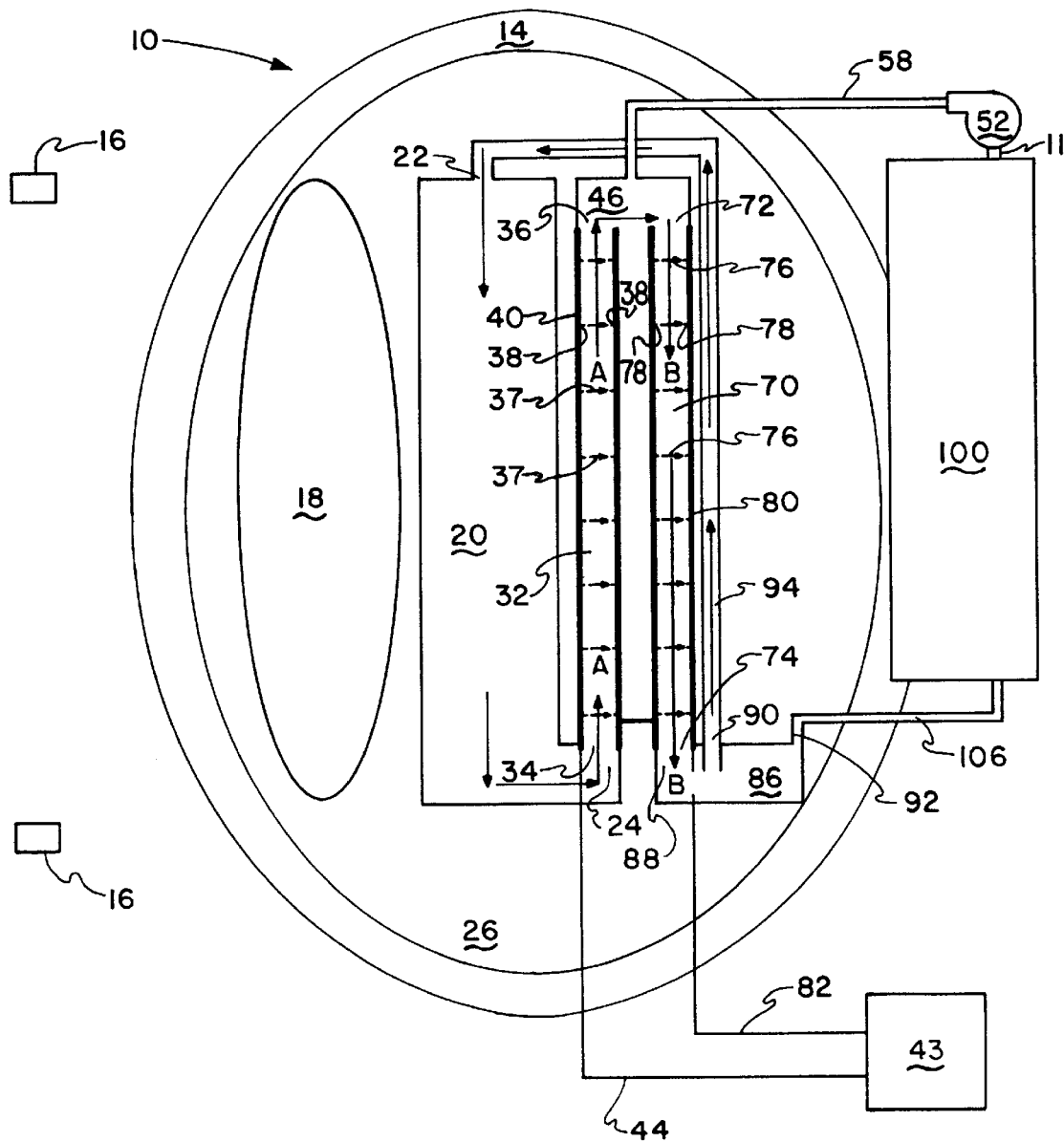
FIG. 2 is a partial elevational view of the electric production system in cross-section taken substantially along the line B—B of FIG. 1.

Referring now to FIG. 2, the magnetically confined DT fueled thermonuclear fusion reactor 10 is depicted in cross section as referenced by cut B—B in FIG. 1. In the depicted embodiment, the magnetic confinement is generated by the plurality of quasiaxisymmetric TF electromagnet coils 14 with a thermonuclear DT plasma neutron source 18 located internal to the quasiaxisymmetric TF electromagnet coils 14.

A review of FIG. 2 depicts a high intensity DT neutron heating fusion blanket or preferably a liquid metal blanket region 20 having an inlet 22 and outlet 24 opposite the inlet 22, located near a bottom 26 of the fusion reactor 10. The relative positions of the plasma neutron source 18 and the liquid metal blanket 20 allow a cool, low-pressure liquid metal 28, preferably lithium or lithium-bearing liquid, to be heated by the plasma neutron source 18, eliminating the need for a dedicated heat exchanger.

Hot, low-pressure liquid metal exits the liquid metal blanket region 20 at the outlet 24 and flows in direction A into a "MHD pump" duct 32 having a predetermined major radius and a quasiaxisymetric shape about centerline A—A. The flow direction A runs from end 34 of the MHD pump duct 32 to end 36 opposite end 34, which in the embodiment depicted in FIG. 2 is upward. A "radial" electrical current 37 flows perpendicular to both the flow of the hot, low-pressure liquid metal and the toroidal magnetic field (not shown) generated by the quasiaxisymetric TF electromagnet coils 14. The radial current 37 is driven through the hot, low-pressure liquid metal in the MHD pump duct 32 via quasiaxisymetric electrodes 38 on duct walls 40 contained therein in a direction perpendicular to the toroidal magnetic field, to form an electromagnetic pump. The J×B force density of the electromagnetic pump in the first flow direction A counteracts the friction caused by the flow of the hot, low pressure liquid metal and act to increase the fluid pressure to form a high pressure, hot liquid metal on exit from duct 32. The mechanical work done by this pump is balanced by its consumption of electrical power due to the v×B electric field induced by fluid motion of the hot, low pressure liquid metal. Current 37 is provided by an external circuit electrically connected to the electrodes 38 on the duct walls 40 of the MHD pump duct 32 by means of a first electrical connection 44.

A high-pressure mixer 46 is connected to end 36 of the MHD pump duct 32 and is in fluid communication therewith. Additionally, mixer 46 is connected to, and in fluid communication with, a gas pump 52 located external to the plurality of TF electromagnet coils 14. In the depicted embodiment, the gas pump 52 is connected to mixer 46 by gas duct or pipe 58. An externally supplied gas, preferably helium, having a predetermined high pressure is supplied to the mixer 46 by the gas pump 52 and injected into the high pressure hot liquid metal, thus forming a two-phase "Froth" mixture containing small bubbles of the gas.

Mixer 46 is connected to, and in fluid communication with, an quasiaxisymetric MHD generator duct 70 having a predetermined major radius where, similar to the MHD pump duct 32, the MHD generator duct 70 has an end 72 and an opposite end 74. The Froth mixture exits mixer 46 and flows into the MHD generator duct 70 in flow direction B. Flow direction B runs from end 72 of the MHD generator duct 70 to end 74, which in the embodiment depicted in FIG.

2 is downward. Like the MHD pump duct 32, the MHD generator duct 70 also supports electrodes 78 through which radial electrical current 76 flows. Radial electrical current 76 is provided by the MHD generator itself, acting as a power source and driving current through power load 43 which is electrically connected to the quasiaxisymetric electrodes 78 on the duct walls 80 of the MHD generator duct 70 by means of a second electrical connection 82. Here the J×B force density restrains fluid motion. As the fluid pressure of the Froth mixture decreases along the MHD generator duct 70, the entrained bubbles of the gas in the Froth mixture expand and cool the hot, high pressure liquid metal forming a cool, low pressure liquid metal and a hot, low pressure gas decreasing the average fluid density of the Froth mixture and thus, increasing the velocity of the Froth mixture.

As the velocity of the Froth mixture increases, the v×B electric field induced by the fluid motion of the Froth mixture produces a voltage rise in the MHD generator duct 70 causing electrical power to be generated. Part of this power is recirculated to operate the MHD pump duct 32 and other equipment, while the rest of this power is directly available as electrical output power from the fusion reactor 10.

The Froth mixture can be recycled. A two-phase Froth mixture emerges from the MHD generator duct 70 and flows into a low-pressure separator 86. As shown in FIG. 2, the separator 86 has: an inlet 88 in connected to, and in fluid communication with, end 74 of the MHD generator duct 70, a liquid metal outlet 90 and a gas outlet 92. The separator 86 separates the cool, low pressure liquid metal and the large bubbles in the hot, low pressure gas from each other. The cool, low pressure liquid metal flows from the separator 86 into the liquid metal blanket region 20 by means of a liquid metal conduit 94 which is in fluid communication with both the separator 86 and the liquid metal blanket region 20. In this manner the cool, low pressure liquid metal is returned to the liquid metal blanket region 20 and available to be heated again by neutrons generated by the plasma neutron source 18.

The hot, low pressure gas from the separator 86 must be cooled. The separator 86 is connected to and in fluid communication with a heat exchanger 100. The heat exchanger 100 is positioned external to the quasiaxisymetric TF electromagnet coil set 14 so that it is open to the environment. The hot, low pressure gas flows from the separator 86 to the heat exchanger 100 by means of gas duct 106. The hot, low pressure gas is cooled by depositing its "waste heat" into the environment. The cooled, low pressure gas emerges from the heat exchanger 100 and returns to the gas pump 52 which is connected to the heat exchanger 100 by a conduit 114. This cool, low pressure gas is compressed by the mechanical gas pump 52 to a predetermined high pressure before flowing back to the mixer 46.

In operation, the plasma neutron source 18 of the fusion reactor 10 is used to directly heat the cool, low-pressure liquid metal, preferably lithium or lithium-bearing liquid, using neutrons generated thereby, eliminating the need for a dedicated heat exchanger. The now hot, low-pressure liquid metal exits the liquid metal blanket region 20 at the outlet 24, flowing in flow direction A into the closed MHD pump duct 32. Radial electrical current 37 perpendicular to both the flow of the hot, low-pressure liquid metal and the toroidal magnetic field is driven through the hot, low-pressure liquid metal in the MHD pump duct 32 forming the electromagnetic pump.

As described above, the J×B force density of the electro-magnetic pump counteracts the flow friction of the hot, low pressure liquid metal increasing its fluid pressure to form a high pressure, hot liquid metal. Again as described above, the mechanical work done by this pump, −v.J×B per unit volume, is balanced by its consumption of electrical power due to the v×B electric field induced by fluid motion of the liquid metal through the magnetic field, J.v×B per unit volume.

An externally supplied gas, preferably helium, having a predetermined, high pressure is supplied to the mixer 46 by the gas pump 52 and injected into the high pressure hot liquid lithium forming a two-phase "Froth" mixture containing small bubbles of the gas. The Froth mixture exits the mixer 46 and flows into a MHD generator duct 70 in flow direction B. The flow direction B runs from end 72 of the MHD generator duct 70 to end 74, which in the embodiment depicted in FIG. 2 is downward. Like the MHD pump duct 32, the MHD generator duct 70 supports electrodes 78 which supply radial electrical current 76 to the Froth mixture, but unlike the MHD pump duct 32, here the J×B force density restrains fluid motion. As the fluid pressure of the Froth mixture decreases along the MHD generator duct 70, the entrained bubbles in the Froth mixture expand and cool the hot, high pressure liquid metal forming a cool, low pressure liquid metal and the hot, low pressure gas. As the average fluid density of the Froth mixture decreases, the volumetric flow rate of the Froth mixture increases causing more electrical power to be produced in the MHD generator duct than is consumed in the pumping duct. Some of the power is recirculated to operate the MHD pump duct 32 and other equipment, while the rest of this power is directly available as electrical output power from the fusion reactor 10.

The two-phase Froth mixture emerges from the MHD generator duct 70 into a low-pressure separator 86. The separator 86 separates the liquid metal from the large bubbles in the gas. The liquid metal flows from the separator 86 to the liquid metal blanket region 20 by means of a liquid metal conduit 94. In this manner the cool, low pressure liquid metal is returned to the liquid metal blanket region 20 and is available to be heated again by neutrons generated by the plasma neutron source 18.

At the same time the hot, low pressure gas flows from the separator 86 to the heat exchanger 100 by means of gas duct 106, where the hot, low pressure gas is cooled by depositing its "waste heat" into the external environment producing a cool, low pressure gas. The cool, low pressure gas emerges from the heat exchanger 100 and travels by gas conduit 114 to the gas pump 52 where it is compressed by the mechanical gas pump 52 to a predetermined high pressure before being sent back to the mixer 46 and reused.

One optional feature of the present system is that the two MHD ducts may be designed to operate with identically the same electrical current magnitudes, in which case the two ducts can optionally be electrically interconnected in a series opposition circuit, thus automatically circulating power to operate the MHD pump duct and operating the LMMHD power system in a "self-excited" manner. The use of quasiaxisymmetric geometric shapes for the two MHD ducts and for their "series" electrical circuit is unique to the present system, and guarantees the absence of any undesirable LMMHD magnetic perturbations in the plasma. Optionally, this present system may employ multiple successive LMMHD electrical power production stages, each patterned after the above description, if the resultant increase in system efficiency warrants their inclusion.

While a particular embodiment of the thermonuclear fusion electrical power generation system and method has been shown and described, it will be appreciated by those skilled in the art that changes and modifications may be made thereto without departing from the invention in its broader aspects as set forth in the following claims.

What is claimed is:

1. A method for integrating liquid metal magnetohydrodynamic power generation with magnetic fusion energy confinement and fusion blanket technology to produce electrical power from a thermonuclear fusion reactor having a toroidal structure and a plasma confining toroidal magnetic field, the method comprising:

employing a plurality of field magnets to create said confining magnetic field;

positioning an electromagnetic pump and an electromagnetic generator within said confining magnetic field;

heating a liquid metal in a blanket region using neutrons and other radiations produced by a plasma neutron source in spaced relation to the blanket region, thus, forming a hot liquid metal;

flowing said hot liquid metal from said liquid metal blanket region into a pump duct of said electromagnetic pump positioned in spaced relationship to the blanket region of said reactor;

applying an electrical current to the liquid metal in said pump duct to transport said hot liquid metal to a mixer;

mixing a gas having a predetermined pressure with said liquid metal forming a Froth mixture; and generating electrical power by flowing said Froth mixture between current carrying electrodes in a generator duct of said electromagnetic generator positioned in spaced relationship to the pump duct and internal to said confining magnetic field where said Froth mixture's volumetric flow rate in said generating duct is increased via an expansion of said Froth mixture brought on by a decrease in pressure along said generating duct.

2. The method of claim 1 further including separating the Froth mixture into liquid metal and gas components after said Froth mixture exits said generating duct and recycling the liquid metal to said blanket region and cycling said gas to a mechanical pump for recycling to said mixer.

3. The method of claim 1 further including interconnecting electrodes to supply electrical power to an external power load, to said liquid metal pump duct, to a gas pump, and optionally to other equipment and arranging said electrodes in such a manner that the distribution of electrical currents do not produce perturbations in said confining magnetic field in said plasma volume.

4. The method of claim 3 further including generating said electrical power by flowing the Froth mixture through the generator duct located internal to said extended region of said confining magnetic field and operationally dependent thereon with the Froth mixture conducting an electrical output current of the generator duct which interacts with said extended region of said confining magnetic field reducing the pressure of the Froth mixture along the flow direction and increasing said velocity thereof.

5. The method of claim I wherein the liquid metal is lithium or a lithium bearing liquid metal mixture and the gas is helium.

6. A system to directly produce electrical power from a thermonuclear fusion reactor and a confining magnetic field comprising:

a means for flowing a hot liquid metal from a liquid metal blanket region in said reactor to a pump duct in spaced relationship to the blanket region;

an electrical means for applying an electrical current to the liquid metal, so that an electromagnetic pump is formed to pressurize and to move said liquid metal along said pump duct;

a mixer in fluid communication with the pump duct, whereby said liquid metal is mixed with a gas having a predetermined pressure in said mixer to form a Froth mixture; and a generation means for generating said electrical power by flowing the Froth mixture between electrodes located within a generator duct in said confining magnetic field.

7. The system of claim 6 where said reactor is shaped like a toroid and where said magnetic field is a toroidal magnetic field.

8. The system of claim 7 further including a separation means for separating a low pressure, expanded Froth mixture into liquid metal and gas components so that said liquid metal is recycled to said blanket region and said gas is cycled to a mechanical pump for recycling to said mixer.

9. The system of claim 8 further including a plasma source of neutron and other radiations in close spaced relationship to said blanket region for direct heating of said liquid metal therein.

10. The system of claim 9 wherein said generator means includes a liquid metal magnetohydrodynamic generator located internal to said toroidal magnetic field where an electrical current is applied by means of electrodes positioned in said generator to said liquid metal in a direction approximately perpendicular to the liquid metal flow.

11. The system of claim 10 wherein the generator means further includes at least one quasiaxisymmetric generator duct in said generator extending from an end in fluid communication with the mixer towards an opposite end thereof, for flowing and expanding the Froth mixture and where said duct occupies a quasiaxisymmetric position about the center of said toroid.

12. The system of claim 11 wherein the electrical means includes a power source located external to said magnetic field for providing an electric current to the liquid metal, thus forming the electromagnetic pump, and wherein said power source is electrically connected to the generator.

13. The system of claim 12 wherein the liquid metal is liquid lithium or a liquid metal mixture containing lithium and the gas is helium.

14. The system of claim 13 further including said separation means in fluid communication with the generator and the pump, for recycling the Froth mixture by separating the liquid lithium from the helium.

15. A system to directly produce electrical power from a deuterium-tritium (DT) fueled, thermonuclear fusion reactor within an extended region of a plasma confining magnet, comprising:

a plasma neutron source within said extended region of said confining magnetic field for producing a source of neutrons;

a liquid lithium blanket region within said extended region of said confining magnetic field in spaced relationship to the plasma neutron source and in fluid communication with a pump for holding and heating the liquid lithium forming hot liquid lithium using neutrons and other radiations from the plasma neutron source;

a power source located external to said extended region of said confining magnetic field and connected to said pump for driving an electrical current in the hot liquid lithium in a direction perpendicular to a flow of the liquid lithium forming an electromagnetic pump;

a mixer in fluid communication with the pump, whereby the hot liquid lithium is mixed with helium having a predetermined pressure to form a Froth mixture; and a generator having a radial current where said generator is in fluid communication with said mixer and where said Froth mixture in combination with said generator and provides for the generation of said electrical power.

16. The system of claim 15 further including a separator in fluid communication with the generator and the liquid lithium blanket region for recycling the Froth mixture by separating the liquid lithium from the helium.

17. The system of claim 16 further including a helium pump and a heat exchanger which together are in fluid communication with the mixer and the separator, for providing the helium at a predetermined pressure and for the rejection of waste heat.

* * * * *